United States Patent
Choi et al.

(10) Patent No.: US 7,242,667 B2
(45) Date of Patent: Jul. 10, 2007

(54) METHOD AND APPARATUS FOR CALL ADMISSION CONTROL IN A MOBILE COMMUNICATION SYSTEM

(75) Inventors: Jin-Ghoo Choi, Seoul (KR); Sae-Woong Bahk, Seoul (KR); Sang-Jun Mun, Seoul (KR); Sung-Won Lee, Songnam-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 966 days.

(21) Appl. No.: 10/429,724

(22) Filed: May 6, 2003

(65) Prior Publication Data
US 2003/0206537 A1   Nov. 6, 2003

(30) Foreign Application Priority Data
May 6, 2002  (KR) ..................... 10-2002-0024880

(51) Int. Cl.
*H04J 1/16* (2006.01)
(52) U.S. Cl. ..................... 370/232; 370/230; 370/328; 455/453; 455/450
(58) Field of Classification Search ............... 370/232, 370/230, 328; 455/452, 450
See application file for complete search history.

(56) References Cited

U.S. PATENT DOCUMENTS

| | | | |
|---|---|---|---|
| 6,278,701 B1* | 8/2001 | Ayyagari et al. | ............ 370/335 |
| 6,597,922 B1* | 7/2003 | Ling et al. | ................... 455/522 |
| 6,944,125 B1* | 9/2005 | Salmanian | ................... 370/232 |
| 6,944,449 B1* | 9/2005 | Gandhi et al. | .............. 455/425 |
| 6,975,609 B1* | 12/2005 | Khaleghi et al. | ........... 370/335 |
| 7,024,203 B1* | 4/2006 | Naghian | ..................... 455/453 |
| 7,120,115 B1* | 10/2006 | Laaksonen | ................... 370/230 |

* cited by examiner

Primary Examiner—Danh Le
(74) Attorney, Agent, or Firm—Roylance, Abrams, Berdo & Goodman, L.L.P.

(57) ABSTRACT

A call admission control method and apparatus in a mobile communication network including a plurality of cells. In the call admission control apparatus, a receiver receives a call setup request for a call, a first decider decides the type of the call, and a second decider decides whether the call satisfies a predetermined condition corresponding to the call type and admitting the call if the call satisfies the condition. The condition is that an FER, which is predicted for the call admission using a second average and a second standard deviation of received power, is less than or equal to a predetermined target FER, the second average and second standard deviation being estimated using a first average and a first standard deviation of received power for a predetermined time period and an average received power increment and a standard deviation increment that are produced by the call admission.

36 Claims, 17 Drawing Sheets

METHOD AND APPARATUS FOR CALL ADMISSION CONTROL IN A MOBILE COMMUNICATION SYSTEM

PRIORITY

This application claims priority under 35 U.S.C. §119 to an application entitled "Method and Apparatus for Call Admission Control in a Mobile Communication System" filed in the Korean Intellectual Property Office on May 6, 2002 and assigned Ser. No. 2002-24880, the contents of which are incorporated herein by reference.

BACKGROUND OF THE INVENTION

1. Field of the Invention

The present invention relates generally to a mobile communication system, and in particular, to a method and apparatus for call admission control to guarantee communication quality in a cellular communication network such as a CDMA (Code Division Multiple Access) communication network.

2. Description of the Related Art

CDMA is a multiple access technology most widely used in post-2.5 generation cellular networks. From the system implementation point of view, a CDMA communication network is characterized by soft capacity, as compared to TDMA (Time Division Multiple Access) and FDMA (Frequency Division Multiple Access). In the CDMA network, each user is identified by a unique code and if a set of codes with orthogonality is used, as many users as the available codes can theoretically be serviced concurrently. In a forward link (or an uplink), however, it is impossible to use orthogonal codes due to different propagation delays caused by different distances between users and a base station. Thus, other users' signals are noise to another user.

In digital communication, signal-to-noise ration (SNR) determines bit error rate (BER). As more users are serviced simultaneously, the BER for each user is higher. In real implementation, data is delivered on a frame basis. If a BER is increased, it leads to an increase of a frame error rate (FER). Therefore, the FER must be maintained at or below a predetermined value in order to provide acceptable communication quality to the user. On the other hand, this means limitation of the number of users to be simultaneously serviced. That is, the maximum number of users to be serviced simultaneously is not fixed but depends on the communication quality that the system guarantees. This system characteristic is termed soft capacity.

In view of the soft capacity, the CDMA communication system has a variable capacity under the circumstances. The circumstances relate to noise. For example, noise factors include intra-cell interference, inter-cell interference, and background noise containing thermal noise. Among the noise factors, it is impossible to accurately estimate the inter-cell interference. In this context, a call setup request must be admitted or rejected adaptively according to existing conditions in order to maintain FER at or below an acceptable level. This process is usually called "call admission control (CAC)".

A traditional CAC operation is disclosed in Klein S. Gilliousen, "On the Capacity of a Cellular CDMA System," IEEE Transactions on Vehicular Technology, vol. 40, pp. 303–312, May 1991 (reference 1), which is incorporated herein by reference. Reference 1 analyzes CDMA system capacity and presents the maximum number of users that can be accommodated based on a given BER being satisfied.

While reference 1 does not deal with CAC explicitly, it is substantially about CAC in that, as illustrated in FIG. 1, which is a flowchart illustrating an example of steps for performing a conventional CAC operation, the maximum number of users to be serviced concurrently is decided. Only call setup requests from users equal to or less than the maximum number are admitted. According to reference 1, the maximum user number is fixed irrespective of network conditions. Hence, a CDMA system adopting the CAC technique is equivalent in effect to a TDMA/FDMA system.

Z. Liu and M. E. Zarki, "SIR-based Call Admission Control for DS-CDMA Cellular Systems," IEEE Journal on Selected Areas in Communications, vol. 12, pp. 638–644, May 1994 (reference 2), which is incorporated herein by reference, provides another traditional CAC operation. According to reference 2, upon receipt of a call setup request, SNR is measured. Only if the SNR is great enough to satisfy a required BER, will the call setup request be admitted as illustrated in FIG. 4 which is a flowchart illustrating an example of steps for performing another conventional CAC operation.

Reference 1 and reference 2 commonly aim to maintain BER at or below a desired value. While it is decided indirectly whether a call setup request can be admitted according to the number of users closely related to noise in reference 1, the decision is directly made according to SNR being a quantitative measurement of BER in reference 2.

A cellular mobile communication system such as CDMA primarily seeks to maintain FER at or below a particular value. Yet, this is not the only purpose of CAC. Although a user wants to receive seamless service, e.g., crossing a cell boundary from one cell to another cell, if the new cell is already full of users, the shortage of resources may bring about service interruption for the user. The cell boundary crossing during a call is called handoff. Needless to say, the number of handoff call drops decreases user satisfaction markedly. Hence, CAC must be performed such that the handoff call dropping probability is diminished, for example, by reserving part of network resources for a handoff call.

As described above, CAC aims to decrease both FER and handoff call dropping probability at or below predetermined values. Hereinafter, an FER and a handoff call drop rate at or below the predetermined values are referred to as "frame-level quality" and "call-level quality," respectively. Despite the equal significance of frame-level quality and call-level quality, most traditional CAC operations consider only one quality. Some CAC operations, even if they consider the two qualities, fail to actually ensure them. Particularly, reference 1 and reference 2 exhibit the following shortcomings.

Reference 1 aims to satisfy the frame-level quality and presents the call admission condition that the current number of users must be less than a preset maximum user number. BER is determined by SNR, as described before. On the assumption that signal strength is constant by power control, noise determines the SNR. Among the noise factors of intra-cell interference, inter-cell interference, and background noise, only the intra-cell interference can be estimated from the current user number. Usually, the background noise can be estimated but the inter-cell interference varies depending on circumstances. For example, network conditions such as load and the spatial distribution of users affect the inter-cell interference. The network load generally varies with time and geographical areas. Moreover, the user spatial distribution is not uniform due to the influence of topography. It is not easy to preset the maximum number of users that can be accommodated by taking all these considerations into account. Consequently, handoff call dropping probability, which is a criterion of deciding call-level quality, is neglected in reference 1.

FIG. 2 is a graph illustrating FERs in the case of a uniform user spatial distribution in a simulation of the conventional CAC operation illustrated in FIG. 1. Specifically, FIG. 2 illustrates FERs versus load in the case of a uniform user spatial distribution with a maximum user number of 38, 40, and 42 in a simulated CAC according to reference 1. Referring to FIG. 2, as network load increases, FER also increases. Therefore, unless a maximum load on a cell can be estimated, the maximum user number cannot be decided.

FIG. 3 is a graph illustrating FERs in the case of a non-uniform user spatial distribution in the simulation of the conventional CAC operation illustrated in FIG. 1. Specifically, FIG. 3 illustrates FERs versus load in the case of a non-uniform user spatial distribution in the simulated CAC according to reference 1. Referring to FIG. 3, "non-uniform" indicates a concentration of users 75% outside of a cell. "Hot cell" indicates a cell having a load greater than twice the other cells. As noted from FIG. 3, when users concentrate outside the cell, FER rapidly increases with load. Therefore, if the spatial distribution of users cannot be predicted beforehand, the maximum number of users cannot be decided.

Reference 2 also aims to guarantee frame-level quality and presents the call admission condition that SNR must be higher than a threshold at the moment when a call admission request is received. Reference 2 advantageously reflects various network conditions because noise is directly measured. Because the SNR is a random process that changes rapidly, making the decision about call admission by taking into account only the sample value at the moment of receiving the call setup request may lead to errors. Reference 2 also neglects the handoff call dropping probability.

FIG. 5 is a graph illustrating FERs versus target FERs in a simulation of the conventional CAC operation illustrated in FIG. 4. Specifically, FIG. 5 illustrates FER measurements versus target FERs in a simulated CAC operation according to reference 2. Referring to FIG. 5, with a small network load, an FER is lower than a target FER, but with a large network load, the FER exceeds the target FER.

FIG. 6 is a graph illustrating FERs in the case of a non-uniform user spatial distribution in the simulation of the conventional CAC operation illustrated in FIG. 4. Specifically, FIG. 6 illustrates FERs versus loads in the case of a non-uniform user spatial distribution in the simulated CAC operation according to reference 2. Here, a target FER is set to 0.01. Referring to FIG. 6, while the influence of user concentration outside the cell is not so great as compared to the CAC according to reference 1, as network load increases, an FER measurement exceeds the target FER, sensitively responding to the network load.

SUMMARY OF THE INVENTION

It is, therefore, an object of the present invention to provide a CAC method and apparatus for maintaining an FER at or below a target FER to guarantee frame-level quality and for maintaining handoff call dropping probability at or below a target rate to guarantee call-level quality in a mobile communication network such as a CDMA cellular network.

It is another object of the present invention to provide a CAC method and apparatus for maintaining an FER at or below a target FER to guarantee frame-level quality in a mobile communication network such as a CDMA cellular network.

It is a further object of the present invention to provide a CAC method and apparatus for maintaining handoff call dropping probability at or below a target rate to guarantee call-level quality in a mobile communication network such as a CDMA cellular network.

The above objects are substantially achieved by a call admission control method and apparatus in a mobile communication network including a plurality of cells. According to one aspect of the present invention, in a call admission control apparatus, a receiver receives a call setup request for a call, a first decider decides the type of the call, and a second decider decides whether the call satisfies a predetermined condition corresponding to the call type and admitting the call if the call satisfies the condition. The condition is that an FER, which is predicted for the case of the call admission using a second average and a second standard deviation of received power, is less than or equal to a predetermined target FER. Here, the second average and second standard deviation are estimated using a first average and a first standard deviation of received power for a predetermined time period and an average received power increment and a standard deviation increment that are produced by the call admission.

It is preferred that the call is generated within the cell, is generated from a neighboring cell, is a handoff call to the cell, or is a handoff call to a neighbor cell.

It is preferred that the second average received power is the sum of the first average received power and the average received power increment.

It is preferred that the second average received power is computed by multiplying the average received power increment by an offset and summing the product and the first average received power.

It is preferred that the second standard deviation is computed by summing the square of the first standard deviation and the square of the standard deviation increment and obtaining the square root of the sum.

It is preferred that the second standard deviation is computed by multiplying the square of the standard deviation increment by an offset, summing the square of the first standard deviation and the product, and obtaining the square root of the sum.

According to another aspect of the present invention, in a call admission control apparatus, a receiver receives a call setup request for a call, a first decider decides the type of the call, and a second decider decides whether predetermined first and second conditions corresponding to the call type are satisfied and admitting the call if the conditions are satisfied. The first condition is that an FER, which is predicted for the case of the call admission using a second average and a second standard deviation of received power, is less than or equal to a predetermined first target FER. The second average and second standard deviation are estimated using a first average and a first standard deviation of received power for a predetermined first time period and an average received power increment and a standard deviation increment that are produced by the call admission. The second condition is that an FER measured for a predetermined second time period is less than or equal to a predetermined second target FER.

It is preferred that the call is generated within the cell.

It is preferred that the second decider further decides whether the first condition is satisfied in a neighboring cell.

It is preferred that the second decider further decides whether the second condition is satisfied in a neighboring cell.

According to a further aspect of the present invention, in a call admission control apparatus for a handoff call, a receiver receives a call setup request for a handoff call, and a decider decides whether the handoff call satisfies a predetermined condition and admitting the handoff call if the handoff call satisfies the condition. The condition is that an FER which is predicted for the case of the handoff call admission using a third average and a third standard deviation of received power is less than or equal to a predetermined target FER. Here, the third average and third standard deviation are estimated using a first average and a first standard deviation of received power for a predetermined time period and a second average and a second standard deviation which are determined by an average received power increment and a standard deviation increment that are produced by the handoff call admission and the amount of reserved resources.

It is preferred that the third average received power is the sum of the first average received power and the second average received power.

It is preferred that the third average received power is computed by multiplying the second average received power by an offset and summing the product and the first average received power.

It is preferred that the third standard deviation is computed by summing the square of the first standard deviation and the square of the second standard deviation, and obtaining the square root of the sum.

It is preferred that the third standard deviation is computed by multiplying the square of the second standard deviation by an offset, summing the square of the first standard deviation and the product, and obtaining the square root of the sum.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Several embodiments of the present invention will be described herein below with reference to the accompanying drawings. In the following description, well-known functions or constructions have been omitted for conciseness.

The present invention provides a CAC operation that guarantees both frame-level quality and call-level quality.

As described previously, the frame-level quality refers to FER maintained at or below a target FER and the call-level quality refers to handoff call dropping probability maintained at or below a target rate. A CAC aiming at the frame-level quality is called "a simple CAC" and a CAC aiming at both the frame-level quality and the call-level quality is called "an enhanced CAC". In other words, the enhanced CAC covers the simple CAC. The present invention is applicable to a mobile communication system such as a CDMA cellular network including a plurality of cells.

Figure 1:
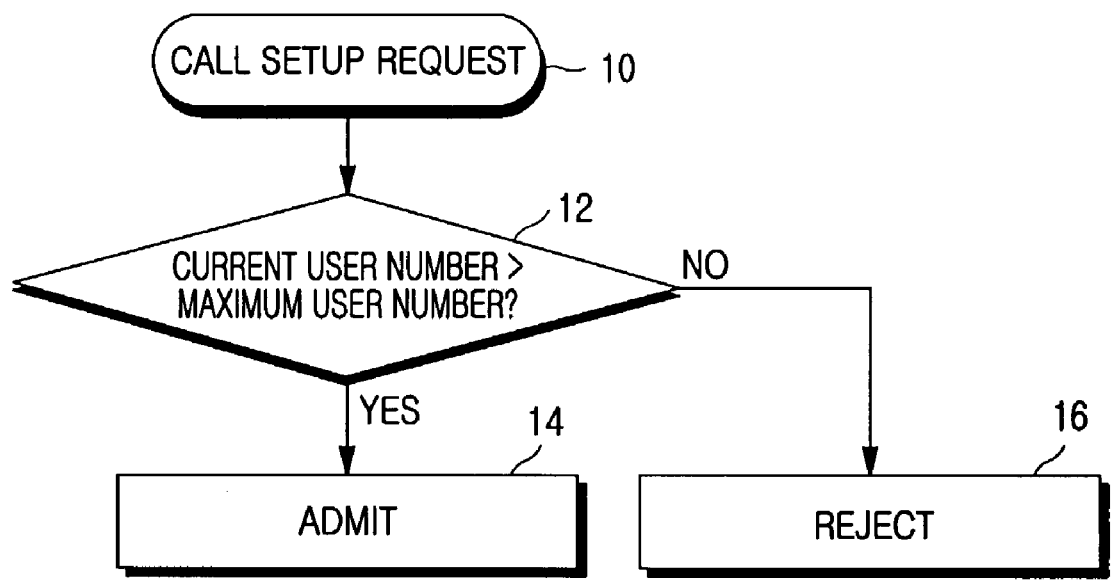
FIG. 1 is a flowchart illustrating an example of steps for performing a conventional CAC operation.
Figure 2:
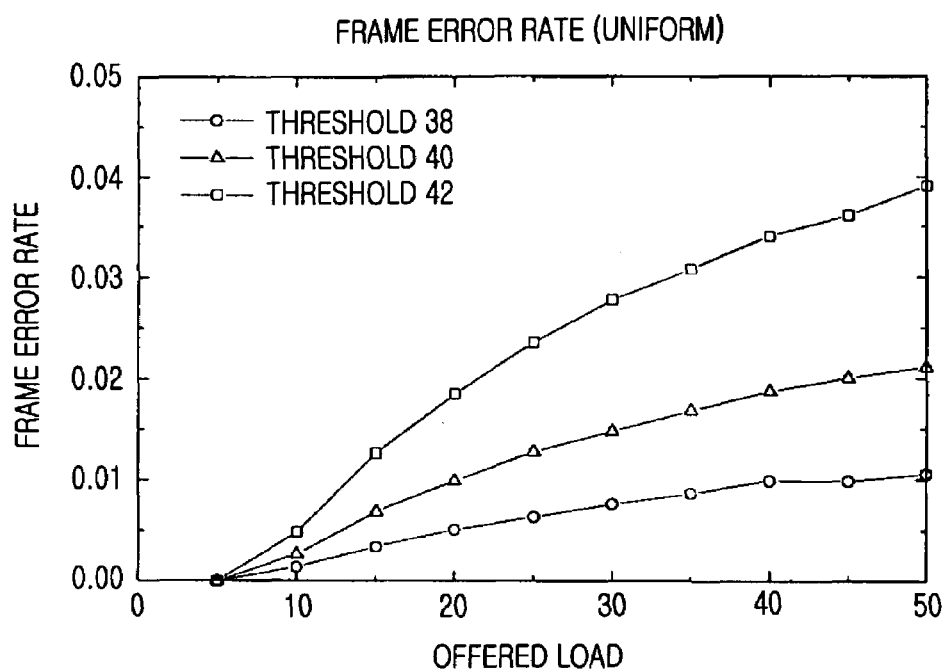
FIG. 2 is a graph illustrating FERs in the case of a uniform user spatial distribution in a simulation of the conventional CAC operation illustrated in FIG. 1.
Figure 3:
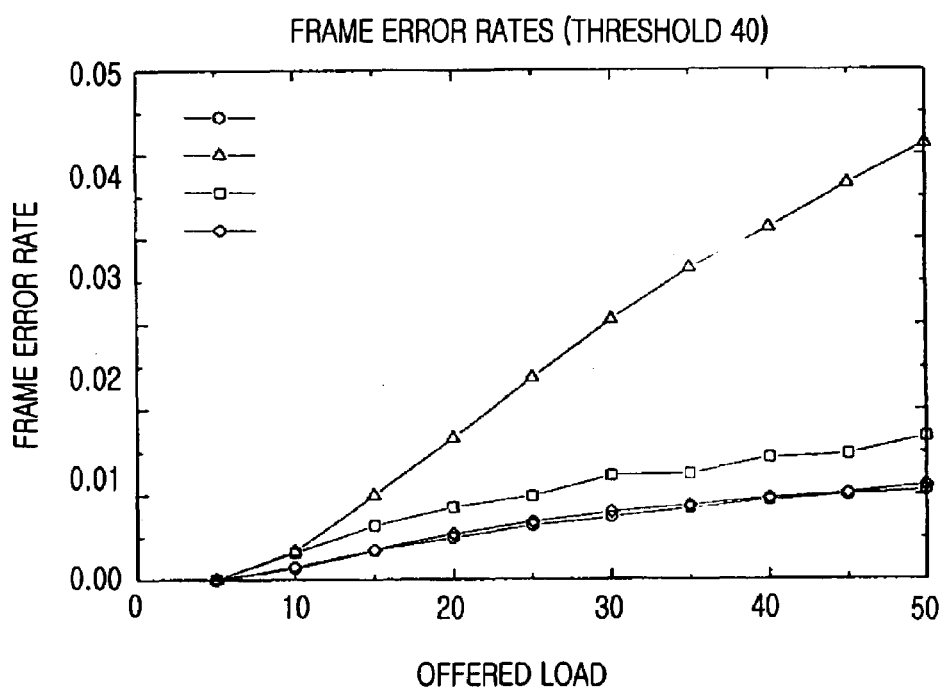
FIG. 3 is a graph illustrating FERs in the case of a non-uniform user spatial distribution in the simulation of the conventional CAC operation illustrated in FIG. 1.
Figure 4:
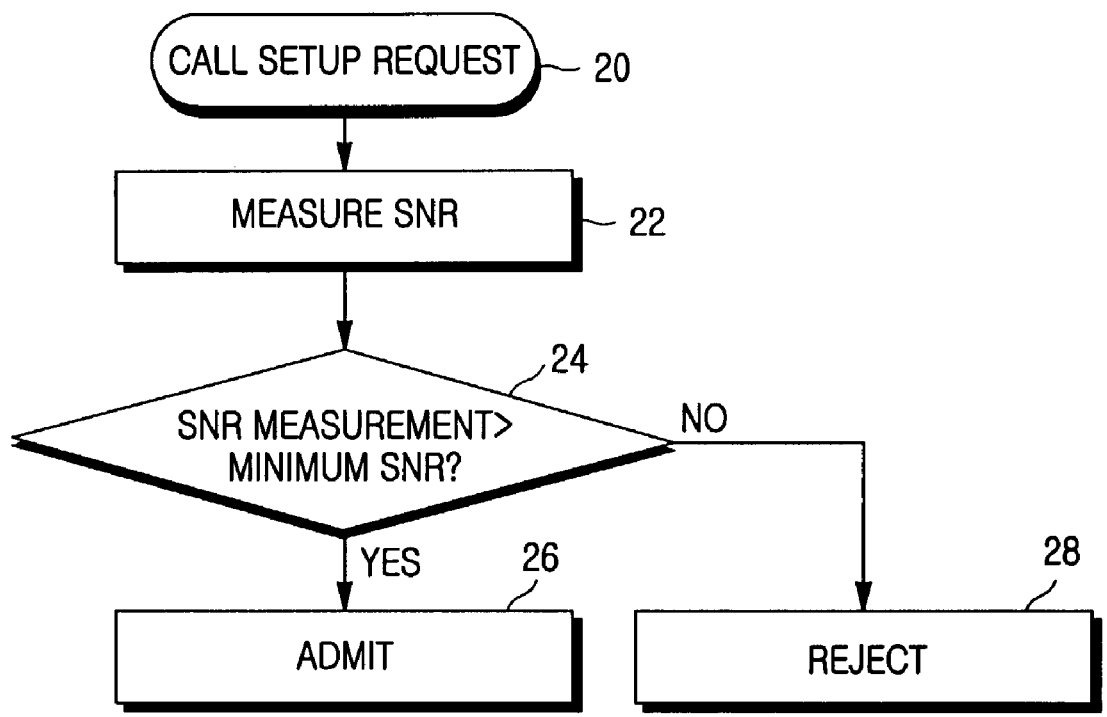
FIG. 4 is a flowchart illustrating an example of steps for performing another conventional CAC operation.
Figure 5:
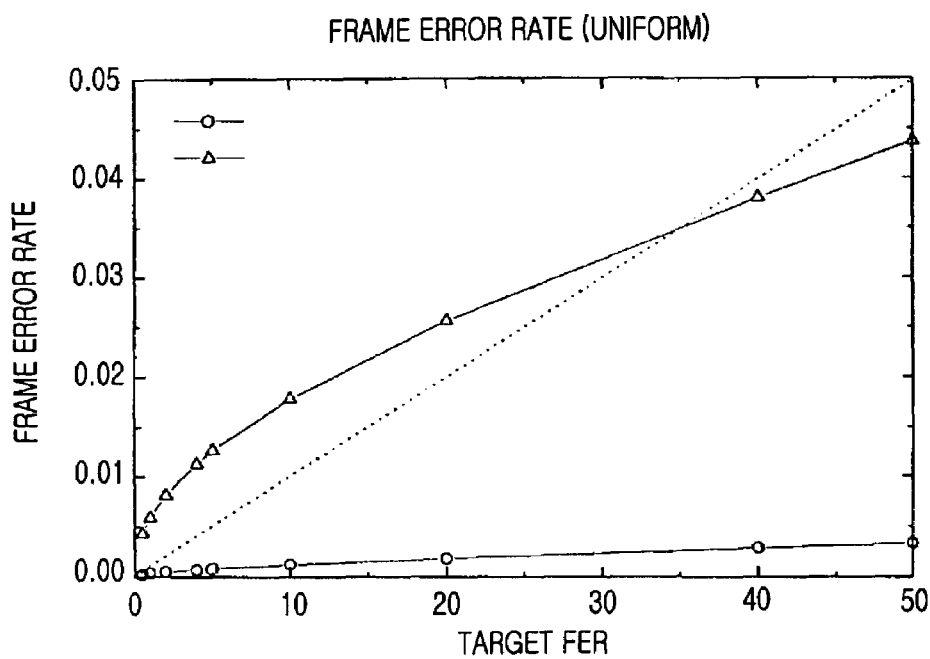
FIG. 5 is a graph illustrating FERs versus target FERs in a simulation of the conventional CAC operation illustrated in FIG. 4.
Figure 6:
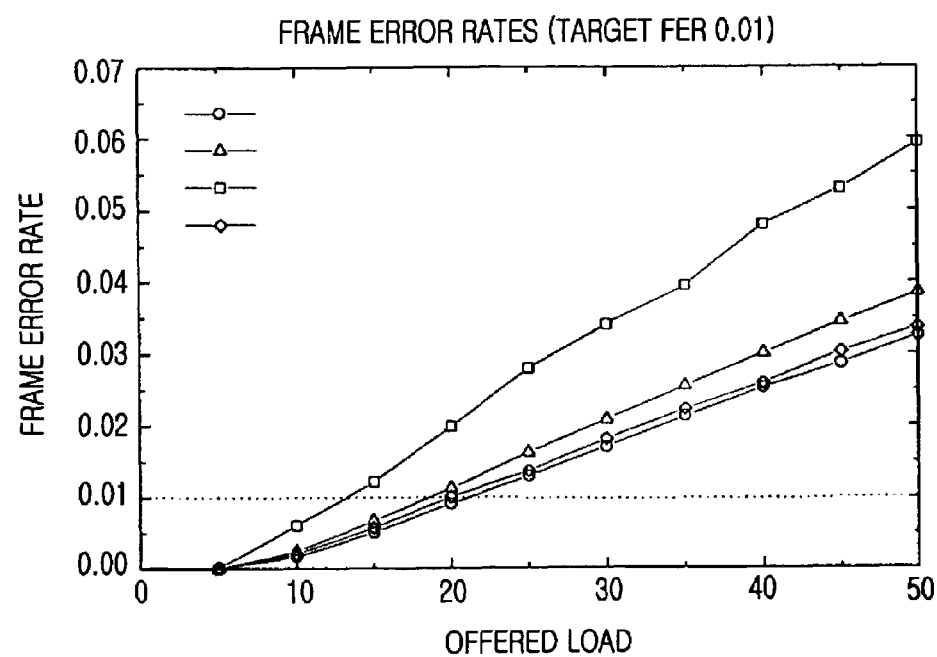
FIG. 6 is a graph illustrating FERs in the case of a non-uniform user spatial distribution in the simulation of the conventional CAC operation illustrated in FIG. 4.
Figure 7A:
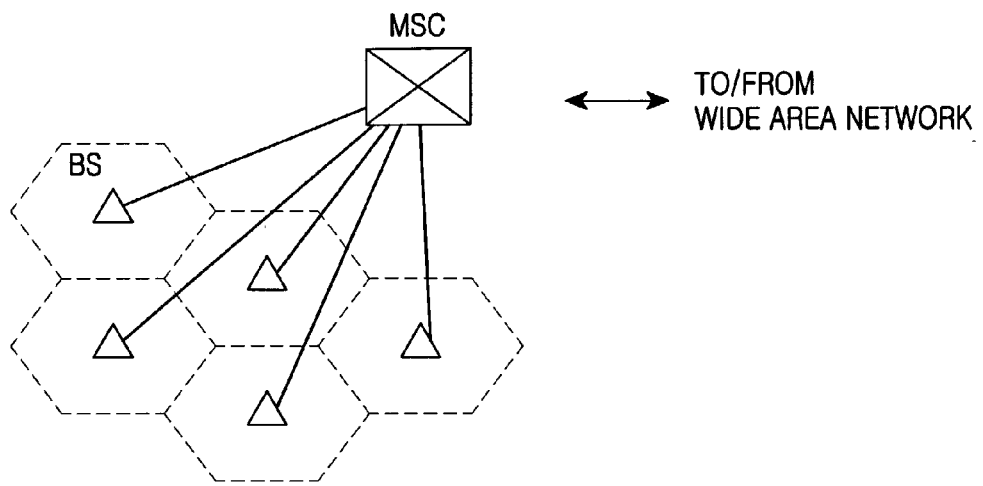
FIGS. 7A and 7B illustrate topologies of BSs in a mobile communication system to which the present invention is applied according to an embodiment of the present invention.
Figure 7B:
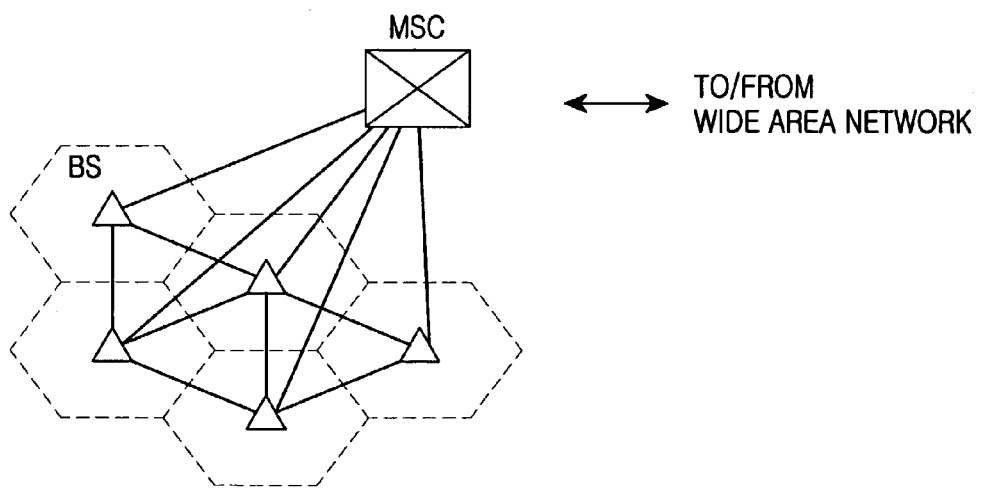

FIGS. 7A and 7B illustrate topologies of BSs in a mobile communication system to which the present invention is applied according to an embodiment of the present invention. The mobile communication network can be configured in a star topology as illustrated in FIG. 7A or in a fully-connected topology as illustrated in FIG. 7B.

Referring to FIGS. 7A and 7B, a mobile switching center (MSC) controls a plurality of base stations (BSs) and functions as a gateway between the BSs and a wide-area network. In the star topology illustrated in FIG. 7A, the MS is connected to the BSs without a direct connection between the BSs. The star topology is typical in the existing cellular communication systems. In the fully-connected topology illustrated in FIG. 7B, the MS is connected to the BSs with the BSs connected directly to one another. Each of the BSs includes a base station transceiver subsystem (BTS) and a base station controller (BSC). The BSC performs the simple/enhanced CAC operations according to an embodiment of the present invention.

Hereinbelow, a CAC according to an embodiment of the present invention will first be overviewed, followed by a description of a CAC apparatus. Tests T1 and T2 will then be described which are used to decide whether simple CAC conditions are satisfied. Next, the simple CAC and the enhanced CAC will be described and the performance of the CAC operations will finally be analyzed.

A. Overview

Simple CAC

A CAC is a process of determining whether to admit or reject a received call setup request. In accordance with an embodiment of the present invention, two tests T1 and T2 are presented and an appropriate test is performed according to the type of call. If the test is passed, the call is admitted. In Test T1, a received power distribution is modeled and an FER is calculated. Test 2 calculates an actual average FER using the latest slot information. Tests T1 and T2 will be described later.

Calls are divided into either a new call or a handoff call. They are further branched into a call originated within the same cell and a call originated from a neighboring cell. Therefore, calls are classified into a new call originated within the same cell (CT1), a new call originated from a neighboring cell (CT2), a handoff call to the same cell (CT3), and a handoff cell to a neighboring cell (CT4). A different call admission criterion is applied according to the type of a call. For each call type, no tests are performed, only T1 or T2 is performed, or both T1 and T2 are performed. Since the four different cases are available to each call type, the total number of available test combinations for the four call types is $4^4$ (=256). It is impossible to test calls using all the test combinations. Thus only test combinations that satisfy the following design conditions will be considered.

(1) The admissibility of a new call is assessed more strictly than that of a handoff call.

(2) The admissibility of a call originated within the same cell is assessed more strictly than that of a call originated from a neighboring cell.

(3) Test T1 is applied to a call originated within the same cell.

Table 1 lists three criterion combinations that satisfy the above conditions.

TABLE 1

| Call type<br>Test<br>combination | CT1 | CT2 | CT3 | CT4 |
| --- | --- | --- | --- | --- |
| 1 | T1, T2 |  | T1 |  |
| 2 | T1, T2 | T1 | T1 |  |
| 3 | T1, T2 | T2 | T1 |  |

CACs based on combinations 1, 2 and 3 are performed as first, second and third embodiments of the present invention, respectively.

Enhanced CAC

The enhanced CAC is similar to the simple CAC except that test T1 is modified to maintain handoff call dropping probability at or below a target rate. The enhanced CAC according to an embodiment of the present invention adapts the number of virtual users by various bandwidth reservation techniques used to give priority to a handoff call in TDMA/FDMA. One of them can be found in Korea Patent Application No. 2000-57677 entitled "Adaptive Call Admission Control Method and Apparatus for Guaranteeing Service Quality for Handoff in Radio Network" (Jae-Young Lee and Se-Woong Park), which is incorporated herein by reference. Since the enhanced CAC is performed by modifying test T1, "enhanced CAC-combination x (x=1, 2, 3)" is "simple CAC-combination x (x=1, 2, 3) with modified test T1".

B. CAC Apparatus

Figure 8:
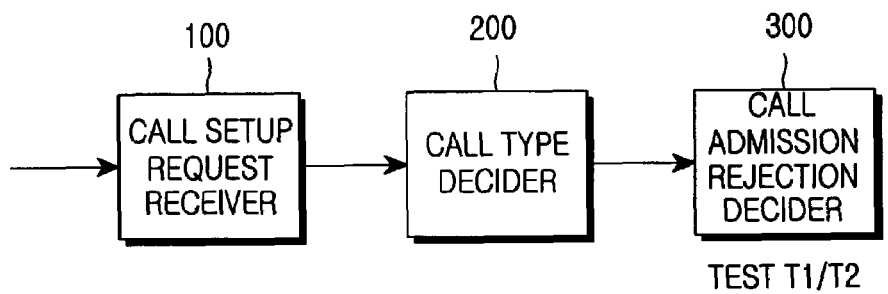
FIG. 8 is a block diagram of a CAC apparatus according to an embodiment of the present invention.

FIG. 8 is a block diagram of a CAC apparatus according to an embodiment of the present invention. The CAC apparatus is integrated into a BS in a mobile communication system including a plurality of cells.

Referring to FIG. 8, the CAC apparatus comprises a call setup request receiver 100, a call type decider 200, and a call admission/rejection decider 300. The call setup request receiver 100 receives a call setup request. The call setup request can be generated within the cell of the BS or from a neighboring cell. The call type decider 200 decides the type of the requested call. Call types are classified into a new call and a handoff call. The classification is further branched into a call originated within the same cell and a call originated from a neighboring cell. That is, the call type decider 200 decides the type of the call as being a CT1, CT2, CT3 or CT4. The call admission/rejection decider 300 determines whether the call satisfies a predetermined condition preset for the call type. If the condition is satisfied, the call admission/rejection decider 300 admits the call. If the condition is not satisfied, it rejects the call.

In the present invention, the call admission/rejection decider 300 makes the decision by performing test T1 or T2, or both on the call. Tests T1 and T2 will be apparent in a later description of FIGS. 9 to 12.

More specifically, the call admission/rejection decider 300 performs tests T1 and T2 for CT1 and test T1 for CT3 in accordance with a first embodiment of the present invention, which will be described in detail with reference to FIG. 13. In accordance with a second embodiment of the present invention, the call admission/rejection decider 300 performs tests T1 and T2 for CT1, test T1 for CT2, and test T1 for CT3, which will be described in detail with reference to FIG. 14. In accordance with a third embodiment of the present invention, the call admission/rejection decider 300 performs tests T1 and T2 for CT1, test T2 for CT2, and test T1 for CT3, which will be described in detail with reference to FIG. 15.

As stated before, the enhanced CACs are achieved by modifying test T1 in the simple CACs. Thus, their description is not provided here.

C. Tests T1 and T2

CACs according to the embodiments of the present invention are applicable to the forward link in a mobile communication network such as a CDMA cellular system. The forward link is comprised of successive slots of a fixed length and each slot duration is equal to the duration of one frame. Each frame starts at a slot boundary.

It is assumed that system-required frame-level quality is an average FER at or below a target FER $e_{max}$. The FER is a monotone decreasing function with respect to a bit energy-to-noise spectral density $\gamma$. In the CDMA system, $\gamma$ is computed by $$\gamma = pg \frac{P_s}{P_{rcv} - P_s} \quad (1)$$

where pg is a processing gain, $P_s$ is a signal power level, and $P_{rcv}$ is a total received power level.

Let the characteristic of channel coding be (L, M, t), which implies that an L-bit code produced by adding redundancy bits to an M-bit block can be recovered against up to t bits random errors. Then, the FER $$f(\gamma) = 1 - \sum_{i=o}^{t} \binom{L}{i} q(\gamma)^i (1 - q(\gamma))^{L-i}.$$

Here, $q(\gamma)$ is a BER and $q(\gamma)=Q\sqrt{2\gamma}$.

With respect to total received power distribution $D_P(p)$ and the FER $f(\gamma)$, the frame-level quality is expressed as $$\bar{e} = \int D_P(p) f(p) dp = \int D_P(p) f\left(pg \frac{P_s}{P - P_s}\right) dp \leq e_{max} \quad (2)$$

Assuming that the total received power follows the Gaussian distribution, with respect to the average m and standard deviation $\sigma$ of $D_P(p)$, equation (2) is $$\bar{e} = \int G(m, \sigma) f\left(pg \frac{P_s}{P - P_s}\right) dp \leq e_{max} \quad (3)$$

To satisfy the condition represented by equation (3), tests T1 and T2 are used as call admission criterions in the embodiments of the present invention.

Test T1

In the present invention, the received power $P_{rcv}(i)$ of each slot and the square of the received power, $P_{rcv}^2(i)$ are stored for a predetermined time period. An average received power $\hat{m}$ and a standard deviation $\hat{\sigma}$ for the predetermined time period are computed using power information about $W_p$ latest slots. The frame characteristic of a call determines an average received power increment $d\hat{m}$ and a standard deviation increment $d\hat{\sigma}$ that are produced as the call is admitted. These values are calculated from a traffic source model or measured. For example, if the call is modeled on an on-off source with an activity factor $\alpha$, $d\hat{m}=P_s\alpha$ and $$d\hat{\sigma} = P_s \sqrt{\alpha(1-\alpha)}.$$

The average received power $\hat{m}_n$ and the standard deviation $\hat{\sigma}_n$ for the case of the call admission are computed by applying $d\hat{m}$ and $d\hat{\sigma}$ to $\hat{m}$ and $\hat{\sigma}$, respectively. The FER $\bar{e}$ is estimated according to equation (3) using the average received power $\hat{m}_n$ and the standard deviation $\hat{\sigma}_n$ for the case of the call admission. If the FER $\bar{e}$ is equal to or less than the target FER $e_{max}$, it is determined that test T1 has passed.

The essence of test T1 is that an FER is estimated by computing momentums of total received power from sample values about some latest slots and predicting the probability distribution of the total received power after a call is admitted by summing the momentums and an additional power momentum produced by the call admission. When the Gaussian distribution is assumed, only an average total received power and a standard deviation are computed. On the other hand, if total received power distribution is approximated to other types of distribution, corresponding momentums must further be computed.

If a tuple of the average total received power and the standard deviation is defined as system state, test T1 proceeds as follows.

(1) A first average received power $\hat{m}$ and a first standard deviation $\hat{\sigma}$ for a predetermined time period are computed by $$\hat{m} = \frac{1}{W_p} \sum_{i=1}^{W_p} P_{rcv}(i)$$

and $$\hat{\sigma}^2 = \frac{1}{W_p} \sum_{i=1}^{W_p} P_{rcv}^2(i) - \hat{m}^2.$$

(2) An average received power increment $d\hat{m}$ and a standard deviation increment $d\hat{\sigma}$ incurred by admitting a call are computed.

(3) A second average received power $\hat{m}_n$ and a second standard deviation $\hat{\sigma}_n$ for the case of the call admission are computed by $\hat{m}_n=\hat{m}+\delta \cdot d\hat{m}$ and $$\hat{\sigma}_n = \sqrt{\hat{\sigma}^2 + \delta \cdot d\hat{\sigma}^2}.$$

$\delta=1$ for a call originated within the same cell and $\delta<1$ for a call originated from a neighboring cell. That is, the second average received power is the sum of the first average received power and the average received power increment, or calculated by multiplying an offset by the average received power increment and adding the first average received power to the product. In the same manner, the second standard deviation is calculated by adding the square of the first standard deviation to the square of the standard deviation increment, or by multiplying an offset by the standard deviation increment and adding the first standard deviation to the product.

(4) If an FER estimated using the second average received power and the second standard deviation according to equation (3) is equal to or less than a target FER, it is determined that test T1 has passed. Thus, test T1 can be expressed as $$T1: \int G(\hat{m}_n, \hat{\sigma}_n) g(p) dP \leq e_{max} \quad (4)$$

Figure 9:
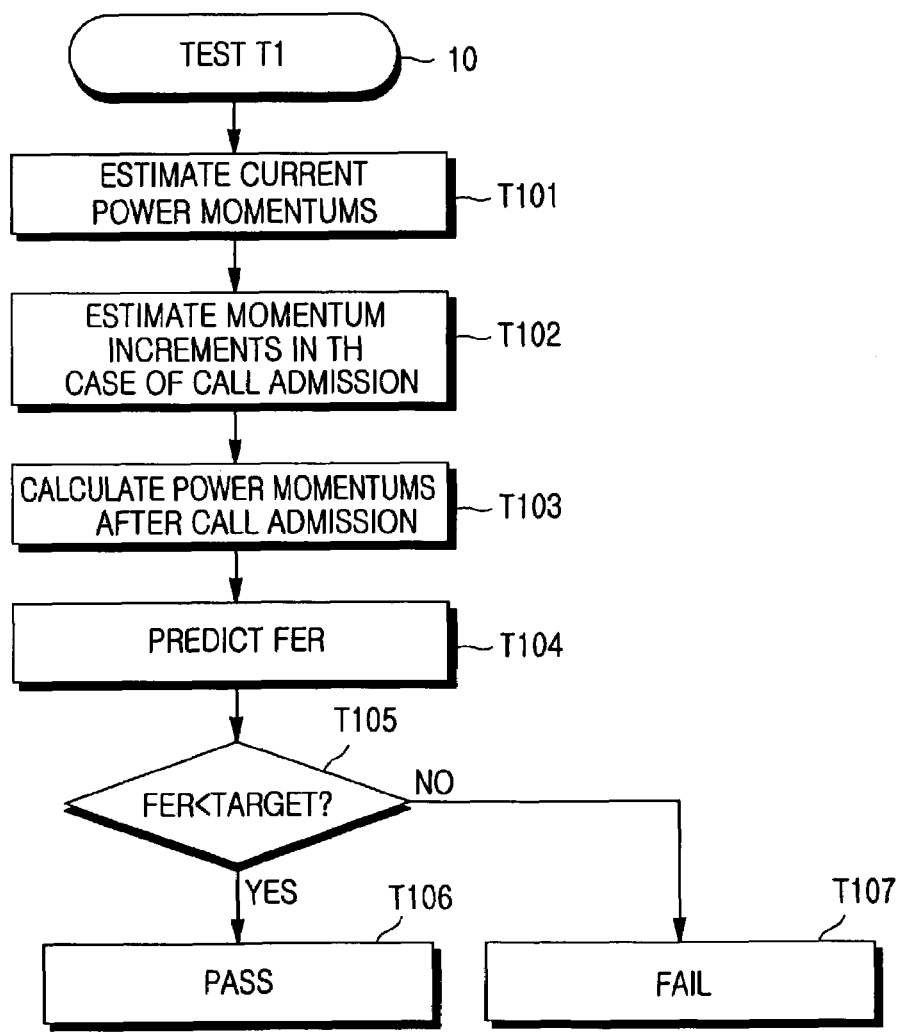
FIG. 9 is a flowchart illustrating an example of steps for performing a test T1 procedure in a call admission/rejection decider illustrated in FIG. 8 according to an embodiment of the present invention.

FIG. 9 is a flowchart illustrating an example of steps for performing a test T1 procedure in the call admission/rejection decider 300 illustrated in FIG. 8 according to an embodiment of the present invention. Referring to FIG. 9, the call admission/rejection decider 300 estimates momentums of the current total received power in step T101. The momentums are an average received power $\hat{m}$ and a standard deviation $\hat{\sigma}$ computed using information about each slot for a predetermined time period. In step T102, the call admission/rejection decider 300 estimates momentums that will be produced as a call is admitted. The momentums are an average received power increment $d\hat{m}$ and a standard deviation increment $d\hat{\sigma}$ incurred by the call admission. The call admission/rejection decider 300 computes the momentums of total received power for the case of the call admission, that is, an average received power $\hat{m}_n$ and a standard deviation $\hat{\sigma}_n$ using $\hat{m}$ & $d\hat{m}$ and $\hat{\sigma}$ & $d\hat{\sigma}$ in step T103. The call admission/rejection decider 300 then estimates an FER $\bar{e}$ from the average received power $\hat{m}_n$ and the standard deviation $\hat{\sigma}_n$ according to equation (3) in step T104 and compares the FER $\bar{e}$ with a target $e_{max}$ using equation (4) in step T105. If $\bar{e}$ is less than or equal to $e_{max}$, it is determined that test T1 has passed in step T106. Otherwise, it is determined that test T1 has failed in step T107.

Test T2

Test T1 assumes that total received power follows the Gaussian distribution. Therefore, the estimated FER may not be accurate. To compensate for an estimation error, test T2 is further considered in the present invention. In test T2, the actual FER of $W_h$ latest slots is measured and if the FER measurement is greater than the target FER $e_{max}$, no more calls are admitted, to thereby prevent system overload. For this purpose, information about the total number $n_t(i)$ of frames and the number $n_e(i)$ of defective frames received in an ith slot is stored and an average FER is calculated using such information about latest $W_h$ slots by $$\bar{e} = \frac{\sum_{i=1}^{W_h} n_e(i)}{\sum_{i=1}^{W_h} n_t(i)}.$$

Thus, test T2 is expressed as $$T2: \frac{\sum_{i=1}^{W_h} n_e(i)}{\sum_{i=1}^{W_h} n_t(i)} \leq e_{max} \quad (5)$$

Figure 10:
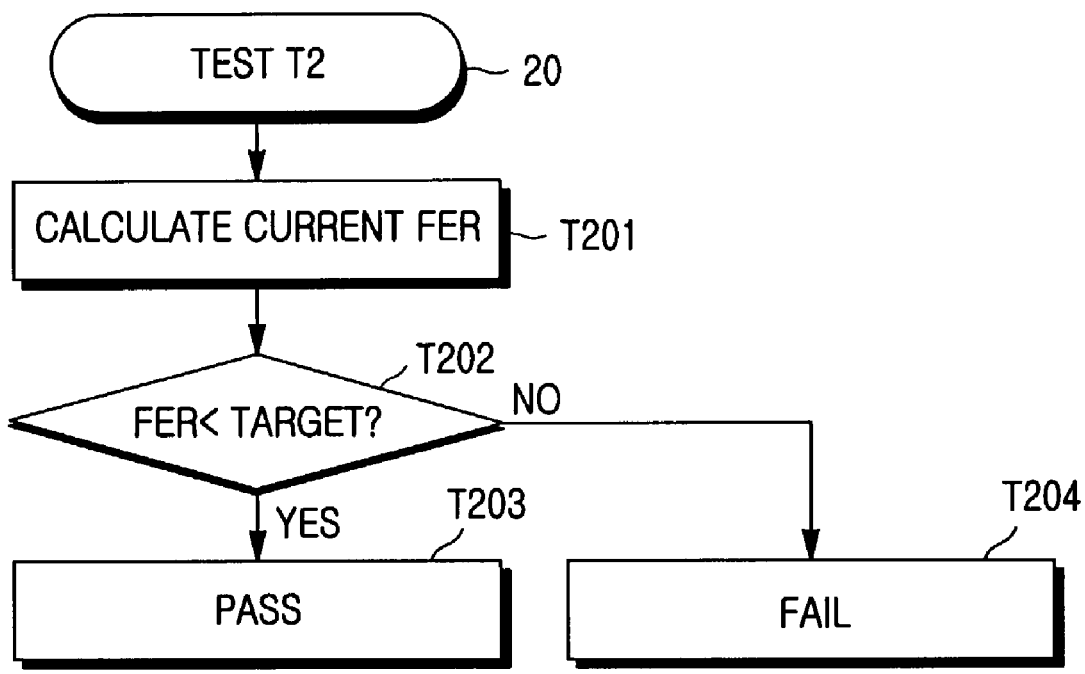
FIG. 10 is a flowchart illustrating an example of steps for performing a test T2 procedure in the call admission/rejection decider illustrated in FIG. 8 according to an embodiment of the present invention.

FIG. 10 is a flowchart illustrating an example of steps for performing a test T2 procedure in the call admission/rejection decider 300 illustrated in FIG. 8 according to an embodiment of the present invention. Referring to FIG. 10, the call admission/rejection decider 300 calculates a current FER $\bar{e}$ using the total number $n_t(i)$ of received frames and the number $n_e(i)$ of defective frames for latest $W_h$ slots by equation (5) in step T201. In step T202, the call admission/rejection decider 300 compares $\bar{e}$ with $e_{max}$. If $\bar{e}$ is less than or equal to $e_{max}$, the call admission/rejection decider 300 determines that test T2 has passed. Otherwise, it determines that test T2 has failed.

Figure 11:
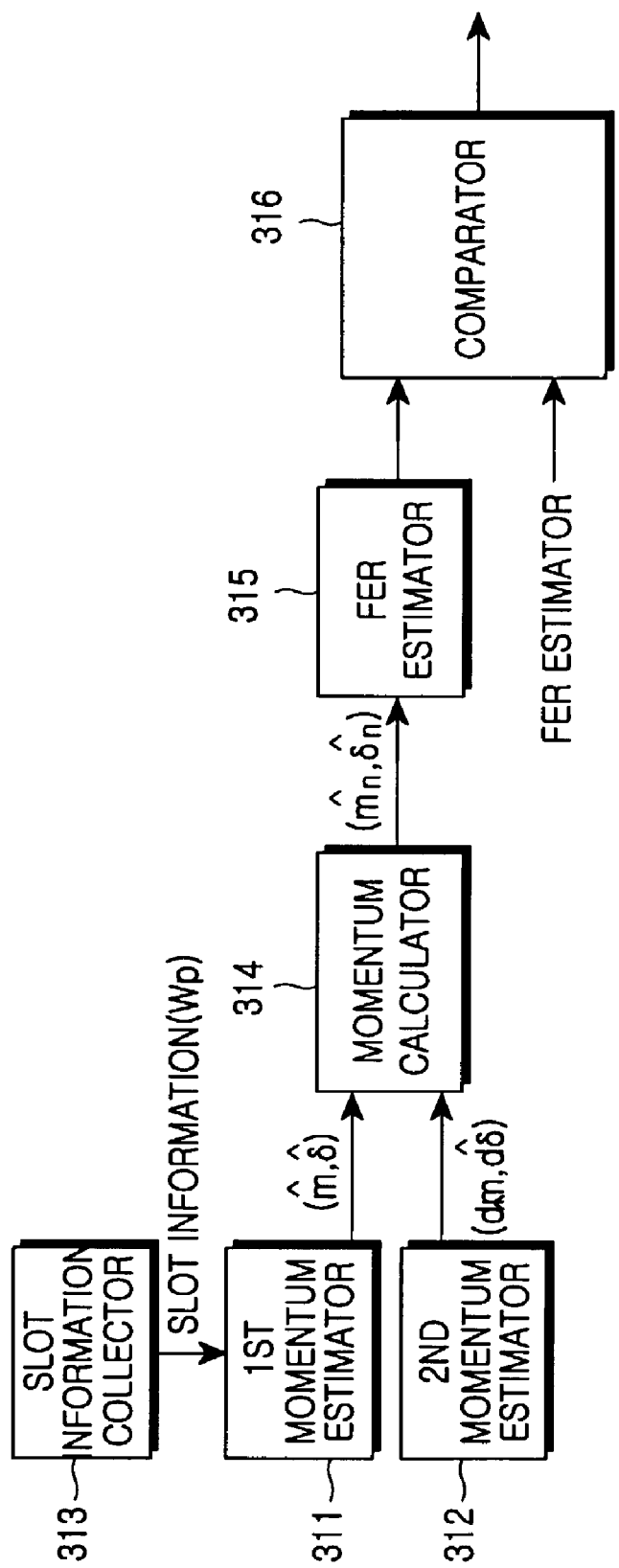
FIG. 11 is a block diagram of a test T1 apparatus that performs the procedure illustrated in FIG. 9 according to an embodiment of the present invention.
Figure 12:
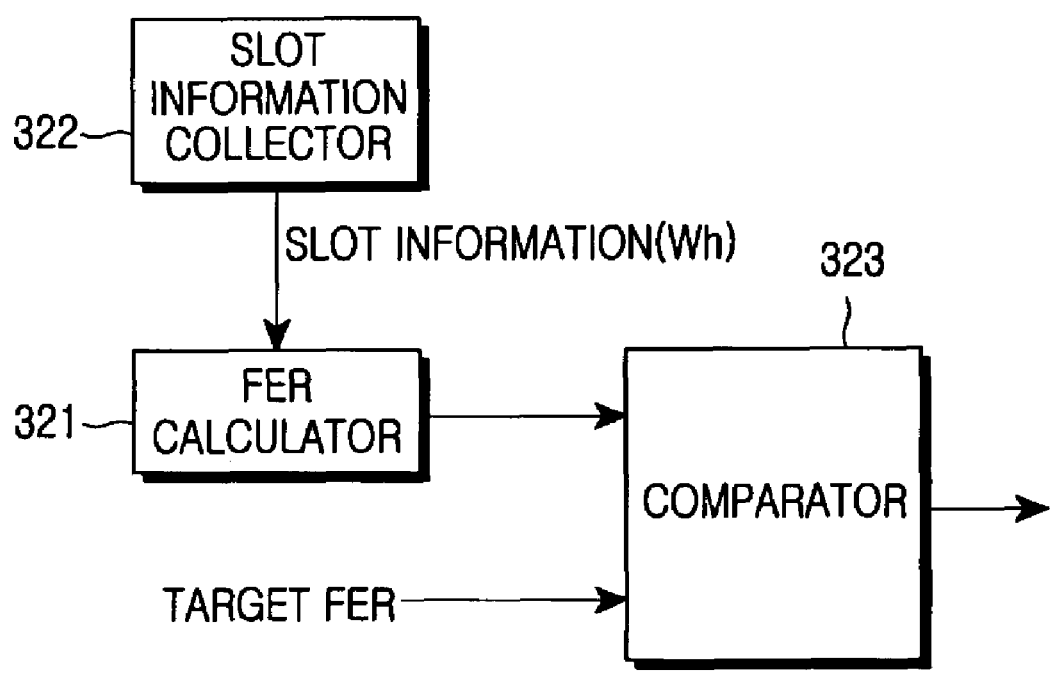
FIG. 12 is a block diagram of a test T2 apparatus that performs the procedure illustrated in FIG. 10 according to an embodiment of the present invention.

FIG. 11 is a block diagram of a test T1 apparatus that performs the procedure illustrated in FIG. 9 according to an embodiment of the present invention. FIG. 12 is a block diagram of a test T2 apparatus that performs the procedure illustrated in FIG. 10 according to an embodiment of the present invention. These apparatuses are integrated into the call admission/rejection decider 300 illustrated in FIG. 8.

Referring to FIG. 11, the test T1 apparatus comprises of a first momentum estimator 311, a second momentum estimator 312, a slot information collector 313, a momentum calculator 314, an FER estimator 315, and a comparator 316. The first momentum estimator 311 estimates an average received power $\hat{m}$ and a standard deviation $\hat{\sigma}$ for a predetermined time period using slot information $W_p$ received from the slot information collector 313. The second momentum estimator 312 estimates an average received power increment $d\hat{m}$ and a standard deviation increment $d\hat{\sigma}$ which will be incurred as a call is admitted. The momentum calculator 314 calculates an average received power $\hat{m}_n$ from using $\hat{m}$ & $d\hat{m}$ and a standard deviation $\hat{\sigma}_n$ from $\hat{\sigma}$ & $d\hat{\sigma}$, for the case of the call admission. The FER estimator 315 estimates the FER $\bar{e}$ from the average received power $\hat{m}_n$ and the standard deviation $\hat{\sigma}_n$. The comparator 316 compares the FER $\bar{e}$ with the target FER $e_{max}$ according to equation (4). If $\bar{e}$ is less than or equal to $e_{max}$, it is determined that test T1 has passed. Otherwise, it is determined that test T1 has failed.

Referring to FIG. 12, the test T2 apparatus comprises an FER calculator 321, a slot information collector 322, and a comparator 323. The FER calculator 321 calculates a current FER $\bar{e}$ by equation (5) using information about the total number $n_t(i)$ of received frames and the number $n_e(i)$ of defective frames for latest $W_h$ slots received from the slot information collector 322. The comparator 323 compares $\bar{e}$ with $e_{max}$. If $\bar{e}$ is less than or equal to $e_{max}$, it is determined that test T2 has passed. Otherwise, it is determined that test T2 has failed.

The slot information collectors 313 and 322 illustrated in FIGS. 11 and 12 store necessary information about each slot. While the slot information varies depending on a CAC method, the slot information includes $P_{rcv}(i)$, $P_{rcv}^2(i)$, $n_t(i)$, and $n_e(i)$ about each slot.

D. CAC Operations

Simple CAC

CACs according to the embodiments of the present invention are basically identical except for test combinations.

Figure 13:
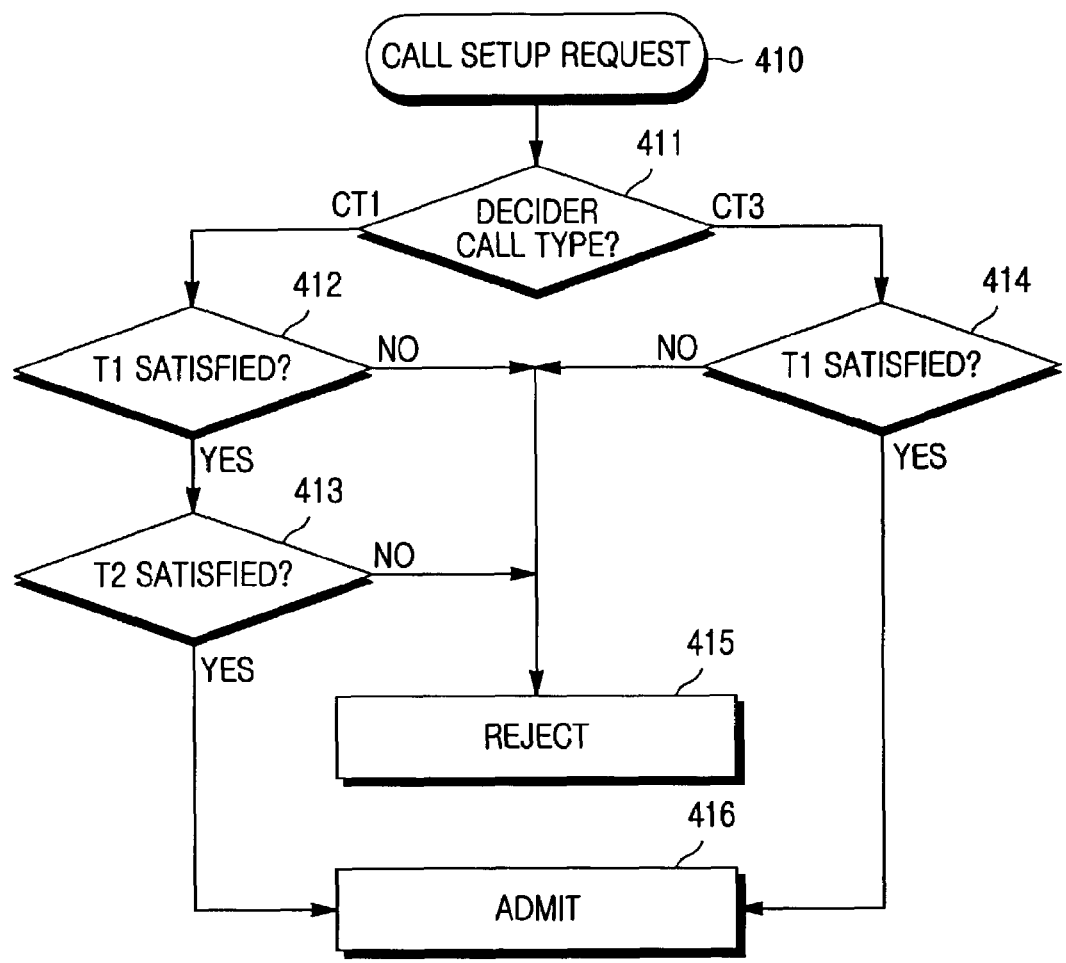
FIG. 13 is a flowchart illustrating an example of steps for performing a simple CAC operation according to an embodiment of the present invention.

FIG. 13 is a flowchart illustrating an example of steps for performing a simple CAC operation according to an embodiment of the present invention. The simple CAC operation is performed as follows.

(1) The call setup request receiver 100 illustrated in FIG. 8 receives a call setup request in step 410.

(2) The call type decider 200 decides the type of the call in step 411.

(3) The call admission/rejection decider 300 performs tests corresponding to the call type. If the call passes the tests, it is admitted. Otherwise, it is rejected. For CT1, the call admission/rejection decider 300 performs test T1 in step 412 and test T2 in step 413. If the call passes both tests t1 and T2, the call admission/rejection decider 300 admits the call in step 416. Otherwise, it rejects the call in step 415. For CT3, the call admission/rejection decider 300 performs test T1 in step 414. If the call passes test T1, the call admission/rejection decider 300 admits the call in step 416. Otherwise, it rejects the call in step 415.

Figure 14:
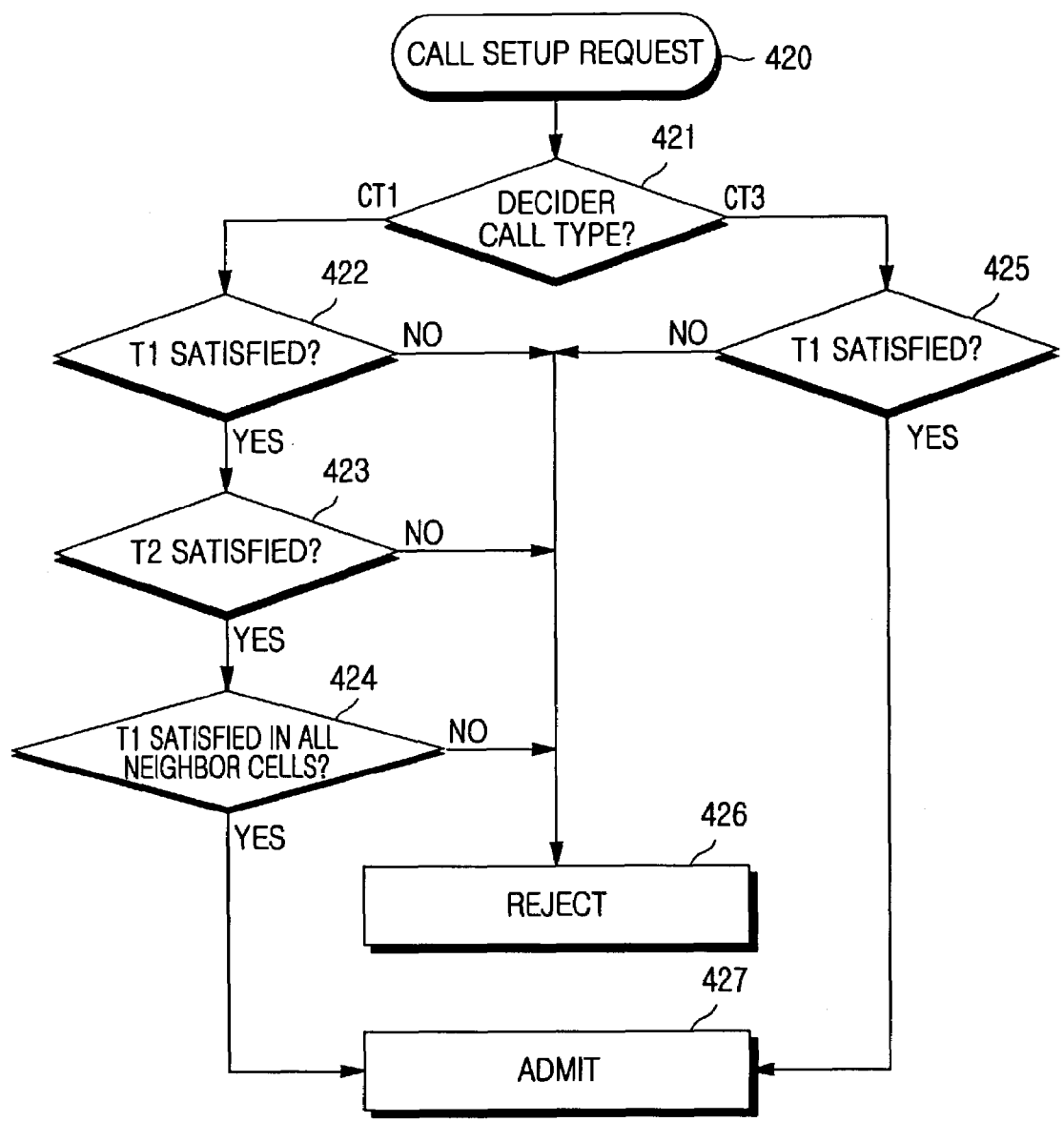
FIG. 14 is a flowchart illustrating an example of steps for performing a simple CAC operation according to another embodiment of the present invention.

FIG. 14 is a flowchart illustrating an example of steps for performing a simple CAC operation according to another embodiment of the present invention. The simple CAC operation is performed as follows.

(1) The call setup request receiver 100 illustrated in FIG. 8 receives a call setup request in step 420.

(2) The call type decider 200 decides the type of the call in step 421.

(3) The call admission/rejection decider 300 performs tests corresponding to the call type. If the call passes the tests, it is admitted. Otherwise, it is rejected. For CT1, the call admission/rejection decider 300 performs test T1 in step 422 and test T2 in step 423. If the call passes both tests T1 and T2, the call admission/rejection decider 300 decides whether test T1 is passed for all neighboring cells in step 424. If it is, the call admission/rejection decider 300 admits the call in step 427. Otherwise, it rejects the call in step 426. For CT3, the call admission/rejection decider 300 performs test T1 in step 425. If the call passes test T1, the call admission/rejection decider 300 admits the call in step 427. Otherwise, it rejects the call in step 426.

Figure 15:
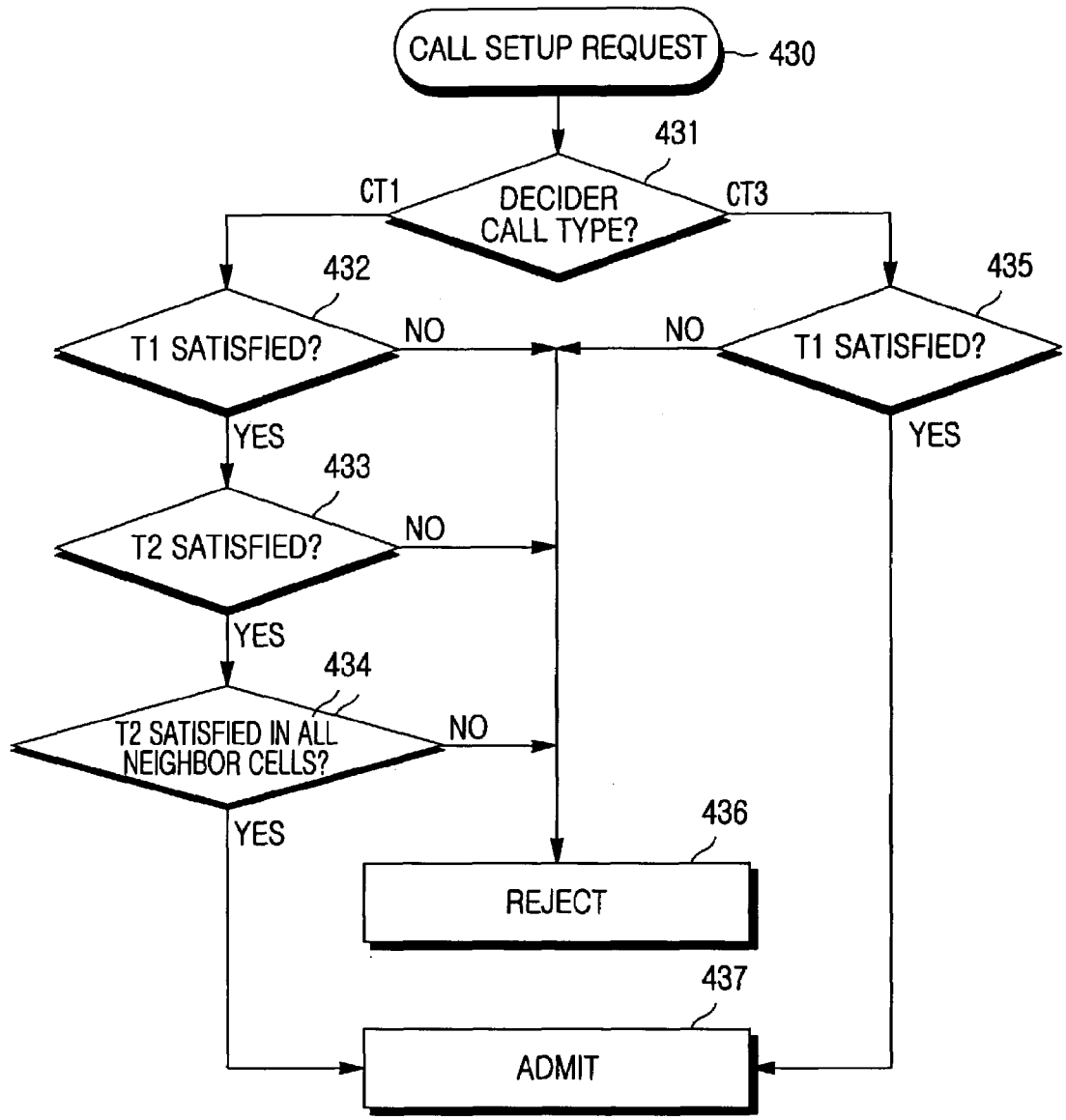
FIG. 15 is a flowchart illustrating an example of steps for performing a simple CAC operation according to a third embodiment of the present invention.

FIG. 15 is a flowchart illustrating an example of steps for performing a simple CAC operation according to a third embodiment of the present invention. The simple CAC operation is performed as follows.

(1) The call setup request receiver 100 illustrated in FIG. 8 receives a call setup request in step 430.

(2) The call type decider 200 decides the type of the call in step 431.

(3) The call admission/rejection decider 300 performs tests corresponding to the call type. If the call passes the tests, it is admitted. Otherwise, it is rejected. For CT1, the call admission/rejection decider 300 performs test T1 in step 432 and test T2 in step 433. If the call passes both tests T1 and T2, the call admission/rejection decider 300 decides whether test T2 is passed for all neighboring cells in step 434. If it is, the call admission/rejection decider 300 admits the call in step 437. Otherwise, it rejects the call in step 436. For CT3, the call admission/rejection decider 300 performs test T1 in step 435. If the call passes test T1, the call admission/rejection decider 300 admits the call in step 437. Otherwise, it rejects the call in step 436.

Enhanced CAC

To diminish handoff call dropping probability in a TDMA/FDMA system, bandwidth reservation is usually performed. The bandwidth reservation allows a handoff call to be admitted more easily by applying a call admission criterion expressed as equation (6) to a new call and a different call admission criterion expressed as equation (7) to the handoff call.

$$C_{oc}+C_{rq} \leq C-C_{rv} \quad (6)$$

$$C_{oc}+C_{rq} \leq C \quad (7)$$

where $C_{oc}$ is the number of channels in current use, $C_{rq}$ is the number of channels that a new call requires, C is the total number of available channels in the system, and $C_{rv}$ is the number of channels reserved for handoff calls. If equation (6) is modified to the form of $C_{oc}+(C_{rq}+C_{rv}) \leq C$, it is identical to equation (7) except that $C_{rq}$ is replaced with $C_{rq}+C_{rv}$. This implies that the admissibility of a new call is assessed more strictly than that of a handoff call by considering the number of channels required for the new call to be the sum of the number of actually required channels and the number of reserved channels for the handoff call.

According to the present invention, the above-described principle is introduced to an enhanced CAC operation by using $(1+v)d\hat{m}$ instead of $d\hat{m}$ and $(1+v)d\hat{\sigma}^2$ instead of $d\hat{\sigma}^2$ in test T1 in order to effect bandwidth reservation in a CDMA system. Here, v is the amount of reserved resources, equivalent to the number of virtual users. The number of virtual users varies under circumstances for the purpose of ensuring handoff call dropping probability at or below a threshold and a related algorithm is called "a virtual user adaptation algorithm". In the present invention, a reserved bandwidth adaptation technique can be used which is disclosed in Korea Patent Application No. 2000-57677 entitled "Adaptive Call Admission Control Method and Apparatus for Guaranteeing Service Quality for Handoff in Radio Network" (Jae-Young Lee and Se-Woong Park), as stated previously. Let test T1 using $(1+v)d\hat{m}$ and $(1+v)d\hat{\sigma}^2$ be termed "modified T1". Then simple CAC is identical to enhanced CAC except for the difference between tests T1 and modified T1. Therefore, the enhanced CAC according to the present invention is apparent even though it is not described here.

E. Performance Analysis

CAC according to the present invention guarantees both frame-level quality and call-level quality. The effects of the CAC will be verified in a simulation. The simulation assumed a network having a 19 hexagonal cell layout. 19-cell clusters were expanded continuously to eliminate edge effect. Each call was modeled on an on-off source. L=511, M=331, and t=20 for the FER f(γ). A system bandwidth W=1.25(MHz) since pg=W/R in equation (3) and a transmission rate R=511(bits)/20(ms)≈25(kbps) since it is a frame size per slot. The other conditions of the simulation are listed in Table 2 below.

TABLE 2

| Item | Value |
| --- | --- |
| Cell radius | 500 (m) |
| System bandwidth | 1.25 (MHz) |
| Slot duration | 20 (msec) |
| Background noise | 0.0 (mW) |
| Channel coding | (511, 330, 20) |
| Average source activation duration | 1.0 (sec) |
| Average source inactivation duration | 1.35 (sec) |
| Average call duration | 180.0 (sec) |
| Average cell stay duration | 60.0 (sec) |

Frame-Level Quality Guarantee

The guarantee of frame-level quality by the simple CAC according to the present invention will be described below.

Figure 16:
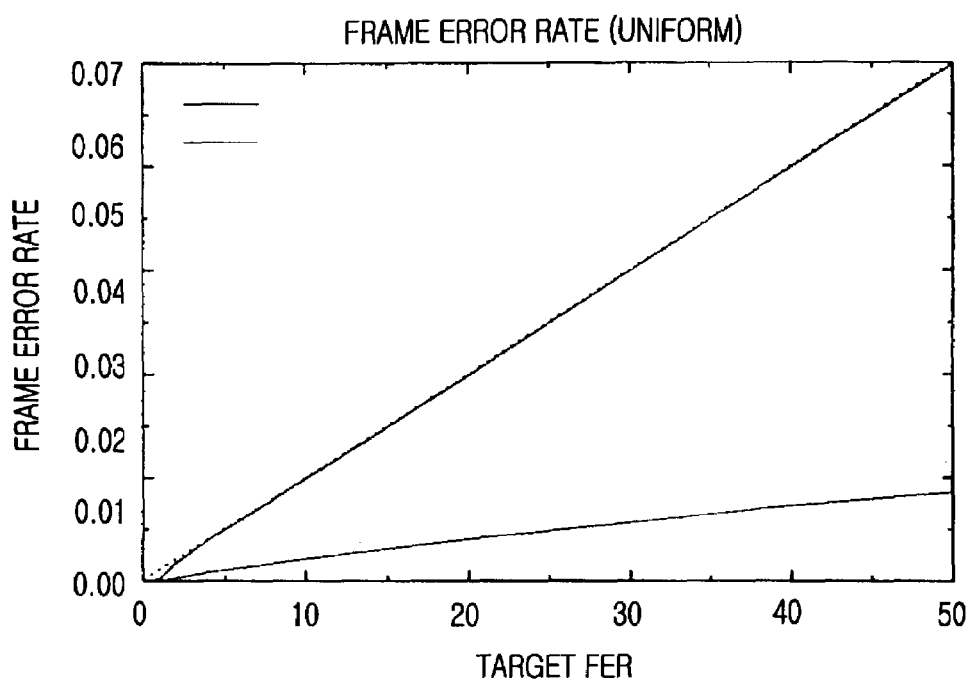
FIG. 16 is a graph illustrating the relationship between actual FERs and target FERs in a simulation of the simple CAC operation according to the first embodiment of the present invention.
Figure 17:
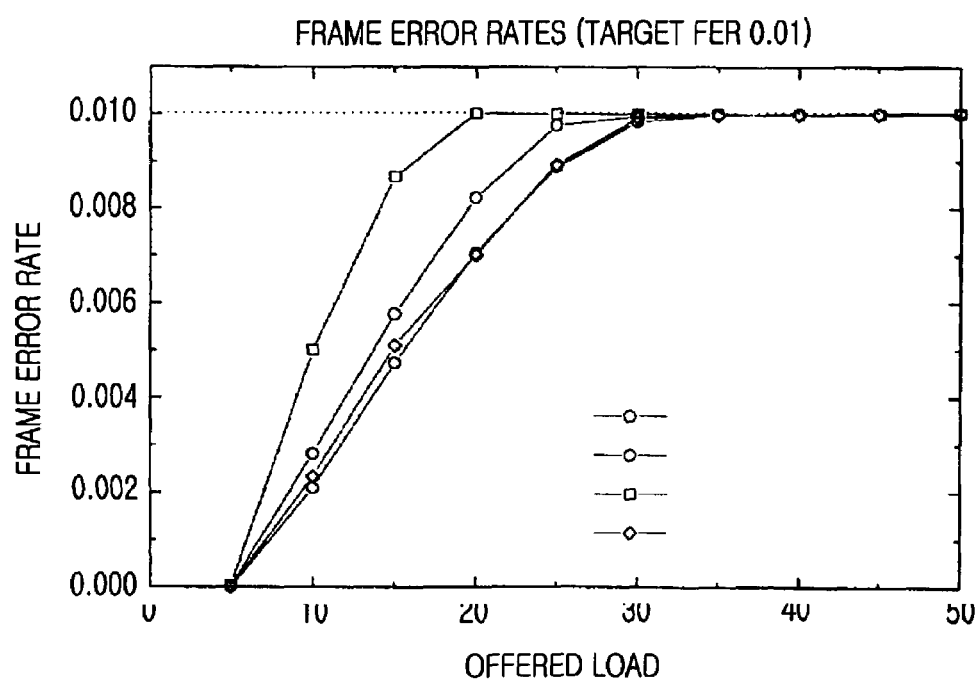
FIG. 17 is a graph illustrating FERs in the case of a non-uniform user spatial distribution in the simulation of the simple CAC operation according to the first embodiment of the present invention.

FIG. 16 is a graph illustrating the relationship between actual FERS and target FERs in a simulation of the simple CAC operation according to the first embodiment of the present invention, and FIG. 17 is a graph illustrating FERs in the case of a non-uniform user spatial distribution in the simulation of the simple CAC operation according to the first embodiment of the present invention.

FIGS. 16 and 17 illustrate simulation results of a simple CAC-combination 1. Referring to FIG. 16, with a small load, an actual FER is far below a target FER. On the contrary, with a large load, the actual FER is almost equal to the target FER. Referring to FIG. 17, FERs versus network loads are illustrated for a target FER of 0.01. Even though the load increases, the actual FER does not exceed the target FER of 0.01 in three cases: uniform user spatial distribution, hot cell ($1^{st}$ ring), and hot cell (center).

A simple CAC-combination 2 and a simple CAC-combination 3 according to the second and third embodiments exhibit similar characteristics to those illustrated in FIGS. 16 and 17, especially in that frame-level quality is strictly satisfied. Therefore, their simulation results will be presented without a detailed description.

Figure 18:
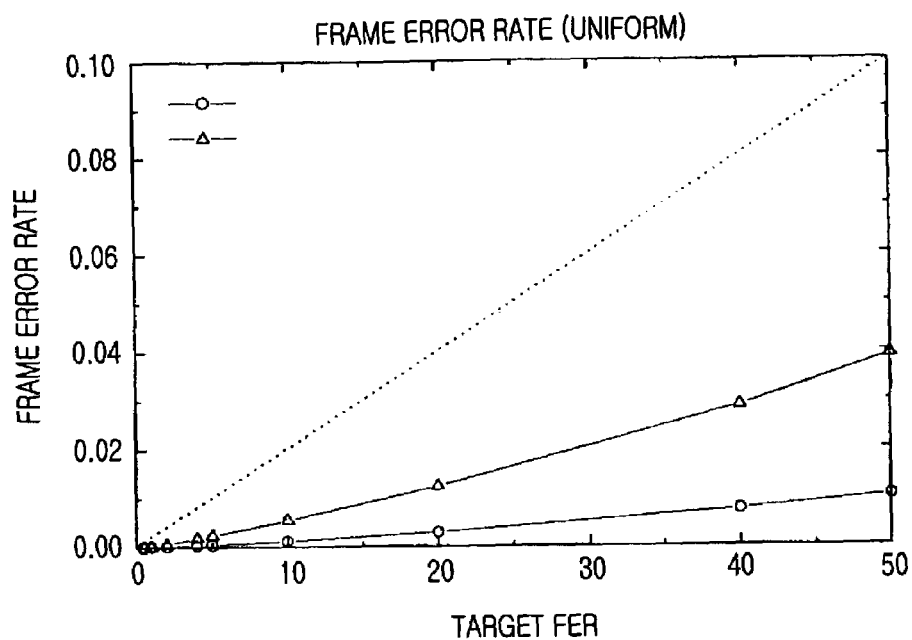
FIG. 18 is a graph illustrating the relationship between actual FERs and target FERs in a simulation of the simple CAC operation according to the second embodiment of the present invention.
Figure 19:
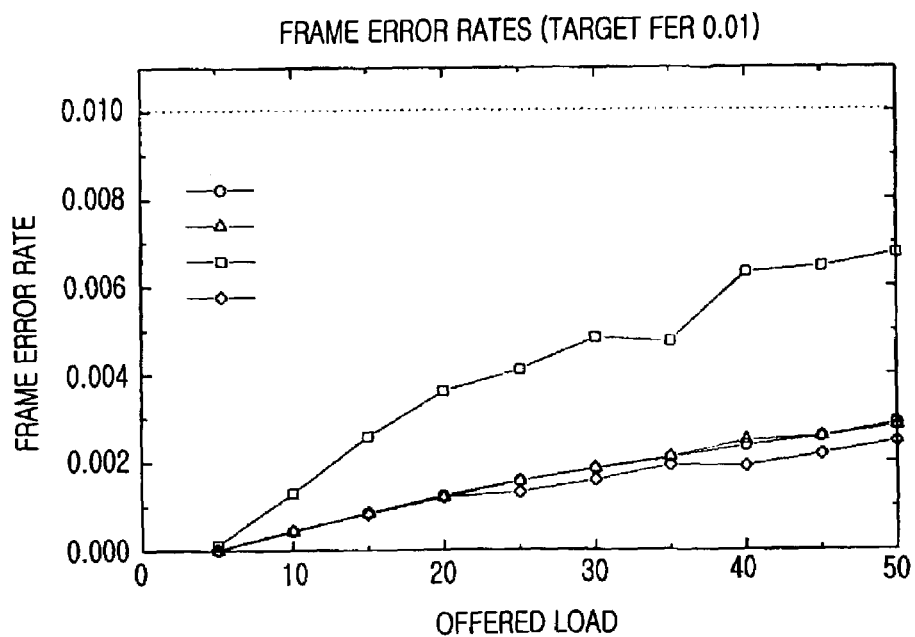
FIG. 19 is a graph illustrating FERs in the case of a non-uniform user spatial distribution in the simulation of the simple CAC operation according to the second embodiment of the present invention.

FIG. 18 is a graph illustrating the relationship between target FERs versus actual FERs in a simulation of the simple CAC according to the second embodiment of the present invention, and FIG. 19 is a graph illustrating FERs in the case of a non-uniform user spatial distribution in the simulation of the simple CAC operation according to the second embodiment of the present invention.

Figure 20:
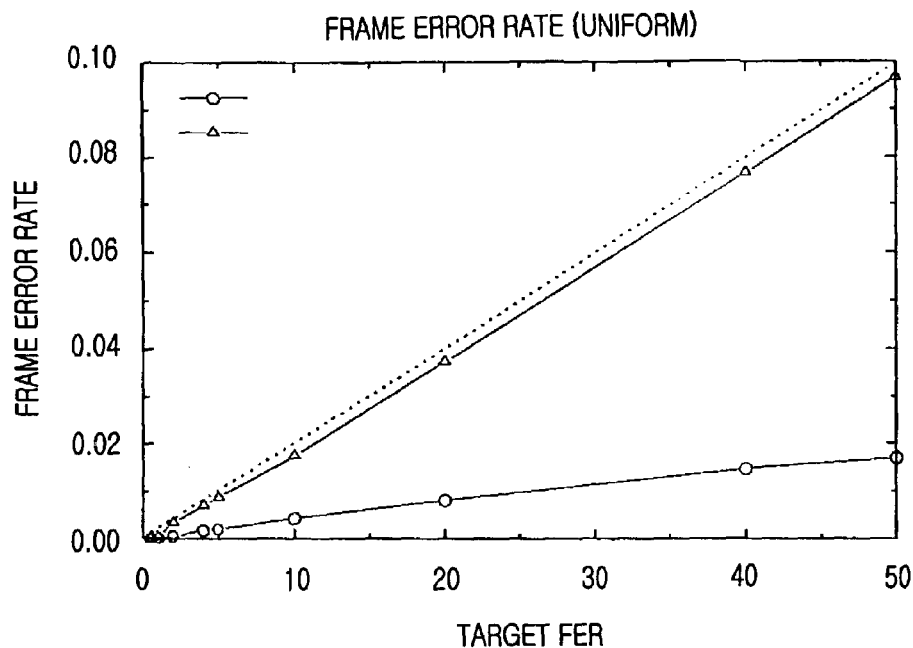
FIG. 20 is a graph illustrating the relationship between actual FERs and target FERs in a simulation of the simple CAC operation according to the third embodiment of the present invention.
Figure 21:
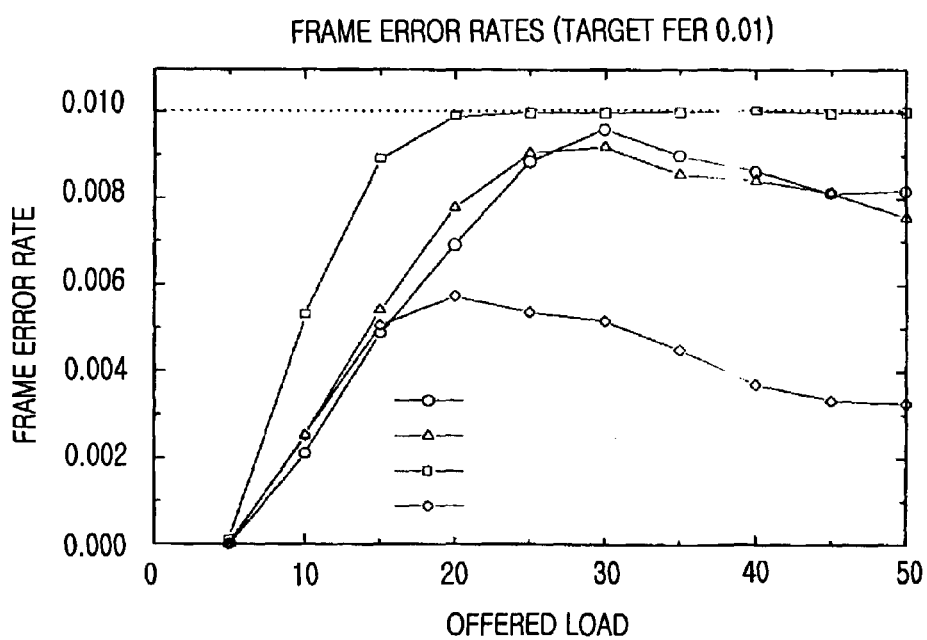
FIG. 21 is a graph illustrating FERs in the case of a non-uniform user spatial distribution in the simulation of the simple CAC operation according to the third embodiment of the present invention.

FIG. 20 is a graph illustrating the relationship between actual FERS and target FERs in a simulation of the simple CAC operation according to the third embodiment of the present invention and FIG. 21 is a graph illustrating FERs in the case of a non-uniform user spatial distribution in the simulation of the simple CAC operation according to the third embodiment of the present invention.

Call-Level Quality Guarantee

The guarantee of call-level quality by the enhanced CAC according to the present invention will be described below.

Figure 22:
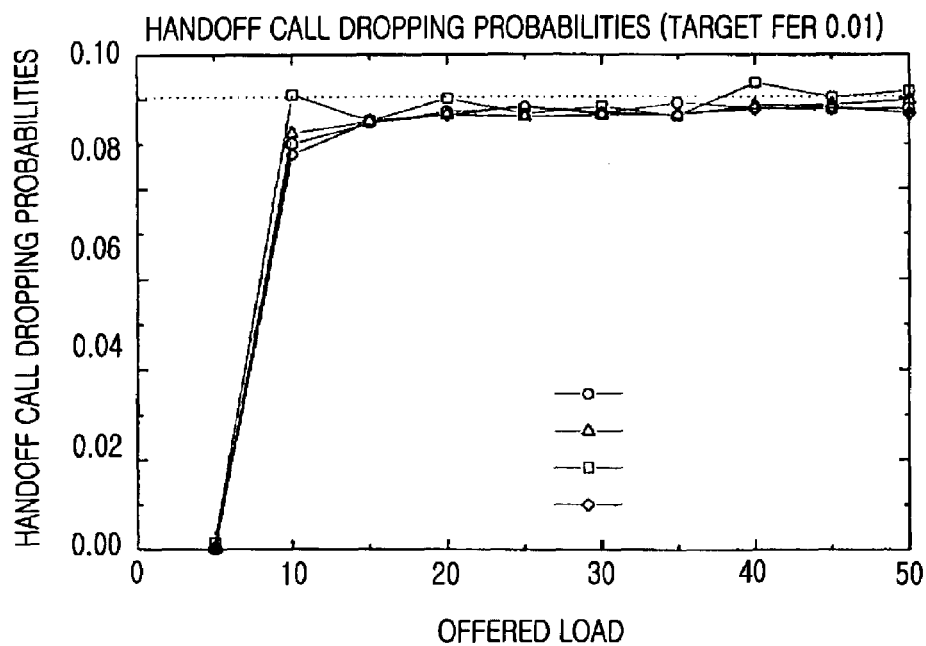
FIG. 22 is a graph illustrating handoff call dropping probabilities in a simulation of an enhanced CAC operation according to the first embodiment of the present invention.
Figure 23:
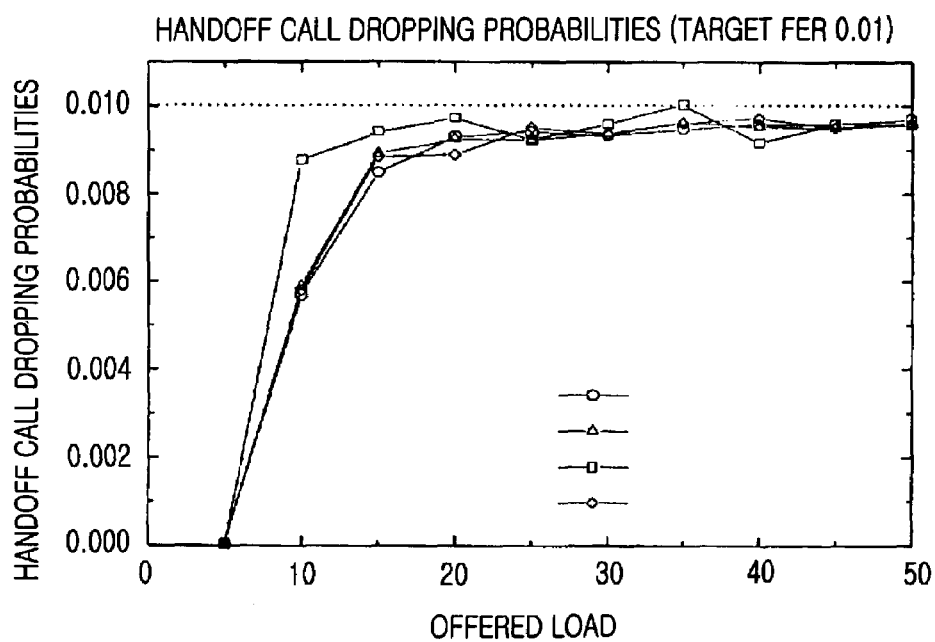
FIG. 23 is a graph illustrating handoff call dropping probabilities in a simulation of an enhanced CAC operation according to the second embodiment of the present invention.
Figure 24:
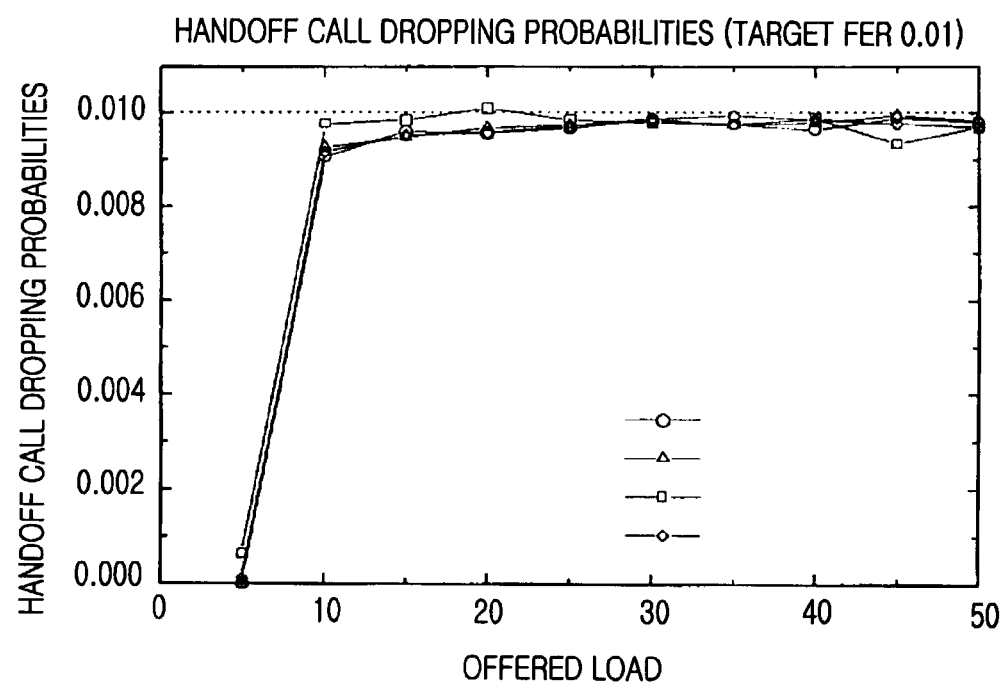
FIG. 24 is a graph illustrating handoff call dropping probabilities in a simulation of an enhanced CAC operation according to the third embodiment of the present invention.

FIG. 22 is a graph illustrating handoff call dropping probabilities in a simulation of an enhanced CAC operation according to the first embodiment of the present invention. FIG. 23 is a graph illustrating handoff call dropping probability in a simulation of an enhanced CAC operation according to the second embodiment of the present invention, and FIG. 24 is a graph illustrating handoff call dropping probability in a simulation of an enhanced CAC operation according to the third embodiment of the present invention.

Referring to FIG. 22, with a target handoff call dropping probability set to 0.01, handoff call dropping probabilities are maintained below the target handoff call dropping probability irrespective of load in the four user spatial distribution cases of uniform, non-uniform, hot cell (center), and hot cell ($1^{st}$ ring). The same results were observed in the simulations of an enhanced CAC-combination 2 and an enhanced CAC-combination 3.

In accordance with an embodiment of the present invention, simple CAC and enhanced CAC maintain an FER at or below a target FER and a handoff call dropping probability at or below a target handoff call dropping probability in a mobile communication network such as a CDMA cellular network. Therefore, both frame-level quality and call-level quality are guaranteed.

While the invention has been shown and described with reference to certain several embodiments thereof, it will be understood by those skilled in the art that various changes in form and details may be made therein without departing from the spirit and scope of the invention as defined by the appended claims.

What is claimed is:

1. A call admission control method in a cell in a mobile communication network including a plurality of cells, comprising the steps of:

determining the type of a call, upon receipt of a call setup request for the call;

determining whether the call satisfies a predetermined condition corresponding to the call type; and admitting the call if the call satisfies the condition, wherein the condition is that a frame error rate (FER), which is predicted for the case of the call admission using a second average and a second standard deviation of received power, is less than or equal to a predetermined target FER, the second average and second standard deviation being estimated using a first average and a first standard deviation of received power for a predetermined time period and an average received power increment and a standard deviation increment that are produced by the call admission.

2. The call admission control method of claim 1, wherein the call is generated within the cell.

3. The call admission control method of claim 1, wherein the call is a handoff call to the cell.

4. The call admission control method of claim 1, wherein the call is generated from a neighboring cell.

5. The call admission control method of claim 1, wherein the call is a handoff call to a neighboring cell.

6. The call admission control method of claim 1, wherein the second average received power is the sum of the first average received power and the average received power increment.

7. The call admission control method of claim 1, wherein the second average received power is computed by multiplying the average received power increment by an offset and summing the product and the first average received power.

8. The call admission control method of claim 1, wherein the second standard deviation is computed by summing the square of the first standard deviation and the square of the standard deviation increment and obtaining the square root of the sum.

9. The call admission control method of claim 1, wherein the second standard deviation is computed by multiplying the square of the standard deviation increment by an offset, summing the square of the first standard deviation and the product, and obtaining the square root of the sum.

10. A call admission control method in a cell in a mobile communication network including a plurality of cells, comprising the steps of:

determining the type of a call, upon receipt of a call setup request for the call;

determining whether the call satisfies predetermined first and second conditions corresponding to the call type; and admitting the call if the call satisfies the conditions, wherein the first condition is that a frame error rate (FER), which is predicted for the case of the call admission using a second average and a second standard deviation of received power, is less than or equal to a predetermined first target FER, the second average and second standard deviation being estimated using a first average and a first standard deviation of received power for a predetermined first time period and an average received power increment and a standard deviation increment that are produced by the call admission, and the second condition is that an FER measured for a predetermined second time period is less than or equal to a predetermined second target FER.

11. The call admission control method of claim 10, wherein the call is generated within the cell.

12. The call admission control method of claim 10, further comprising the step of determining whether the first condition is satisfied in a neighboring cell.

13. The call admission control method of claim 10, further comprising the step of determining whether the second condition is satisfied in a neighboring cell.

14. A call admission control apparatus in a cell in a mobile communication network including a plurality of cells, comprising:
a receiver for receiving a call setup request for a call;
a first decider for deciding the type of the call;
a second decider for deciding whether the call satisfies a predetermined condition corresponding to the call type and admitting the call if the call satisfies the condition,
wherein the condition is that a frame error rate (FER), which is predicted for the case of the call admission using a second average and a second standard deviation of received power, is less than or equal to a predetermined target FER, the second average and second standard deviation being estimated using a first average and a first standard deviation of received power for a predetermined time period and an average received power increment and a standard deviation increment that are produced by the call admission.

15. The call admission control apparatus of claim 14, wherein the call is generated within the cell.

16. The call admission control apparatus of claim 14, wherein the call is a handoff call to the cell.

17. The call admission control apparatus of claim 14, wherein the call is generated from a neighboring cell.

18. The call admission control apparatus of claim 14, wherein the call is a handoff call to a neighboring cell.

19. The call admission control apparatus of claim 14, wherein the second average received power is the sum of the first average received power and the average received power increment.

20. The call admission control apparatus of claim 14, wherein the second average received power is computed by multiplying the average received power increment by an offset and summing the product and the first average received power.

21. The call admission control apparatus of claim 14, wherein the second standard deviation is computed by summing the square of the first standard deviation and the square of the standard deviation increment and obtaining the square root of the sum.

22. The call admission control apparatus of claim 14, wherein the second standard deviation is computed by multiplying the square of the standard deviation increment by an offset, summing the square of the first standard deviation and the product, and obtaining the square root of the sum.

23. A call admission control apparatus in a cell in a mobile communication network including a plurality of cells, comprising:
a receiver for receiving a call setup request for a call;
a first decider for deciding the type of the call; and
a second decider for deciding whether predetermined first and second conditions corresponding to the call type are satisfied and admitting the call if the conditions are satisfied,
wherein the first condition is that a frame error rate (FER), which is predicted for the case of the call admission using a second average and a second standard deviation of received power, is less than or equal to a predetermined first target FER, the second average and second standard deviation being estimated using a first average and a first standard deviation of received power for a predetermined first time period and an average received power increment and a standard deviation increment that are produced by the call admission, and the second condition is that an FER measured for a predetermined second time period is less than or equal to a predetermined second target FER.

24. The call admission control apparatus of claim 23, wherein the call is generated within the cell.

25. The call admission control apparatus of claim 23, wherein the second decider further decides whether the first condition is satisfied in a neighboring cell.

26. The call admission control apparatus of claim 23, wherein the second decider further decides whether the second condition is satisfied in a neighboring cell.

27. A call admission control method for a handoff call in a cell in a mobile communication network including a plurality of cells, comprising the steps of:
determining, upon receipt of a call setup request for a handoff call, whether the handoff call satisfies a predetermined condition; and
admitting the handoff call if the handoff call satisfies the condition,
wherein the condition is that a frame error rate (FER), which is predicted for the case of the handoff call admission, using a third average and a third standard deviation of received power, is less than or equal to a predetermined target FER, the third average and third standard deviation being estimated using a first average and a first standard deviation of received power for a predetermined time period and a second average and a second standard deviation which are determined by an average received power increment and a standard deviation increment that are produced by the handoff call admission and the amount of reserved resources.

28. The call admission control method of claim 27, wherein the third average received power is the sum of the first average received power and the second average received power.

29. The call admission control method of claim 27, wherein the third average received power is computed by multiplying the second average received power by an offset and summing the product and the first average received power.

30. The call admission control method of claim 27, wherein the third standard deviation is computed by summing the square of the first standard deviation and the square of the second standard deviation, and obtaining the square root of the sum.

31. The call admission control method of claim 27, wherein the third standard deviation is computed by multiplying the square of the second standard deviation by an offset, summing the square of the first standard deviation and the product, and obtaining the square root of the sum.

32. A call admission control apparatus for a handoff call in a cell in a mobile communication network including a plurality of cells, comprising:
a receiver for receiving a call setup request for a handoff call;
a decider for deciding whether the handoff call satisfies a predetermined condition and admitting the handoff call if the handoff call satisfies the condition,
wherein the condition is that a frame error rate (FER), which is predicted for the case of the handoff call admission, using a third average and a third standard deviation of received power, is less than or equal to a predetermined target FER, the third average and third standard deviation being estimated using a first average and a first standard deviation of received power for a predetermined time period and a second average and a second standard deviation which are determined by an average received power increment and a standard deviation increment that are produced by the handoff call admission and the amount of reserved resources.

33. The call admission control apparatus of claim 32, wherein the third average received power is the sum of the first average received power and the second average received power.

34. The call admission control apparatus of claim 32, wherein the third average received power is computed by multiplying the second average received power by an offset and summing the product and the first average received power.

35. The call admission control apparatus of claim 32, wherein the third standard deviation is computed by summing the square of the first standard deviation and the square of the second standard deviation, and obtaining the square root of the sum.

36. The call admission control apparatus of claim 32, wherein the third standard deviation is computed by multiplying the square of the second standard deviation by an offset, summing the square of the first standard deviation and the product, and obtaining the square root of the sum.

* * * * *